United States Patent [19]

Slavitter et al.

[11] Patent Number: 4,855,769
[45] Date of Patent: Aug. 8, 1989

[54] PHOTOGRAPHIC APPARATUS FOR MOTORIZED PROCESSING OF INSTANT FILM

[75] Inventors: Frederick Slavitter, Needham; James J. Marchese, Saugus, both of Mass.

[73] Assignee: Polaroid Corporation, Cambridge, Mass.

[21] Appl. No.: 237,531

[22] Filed: Aug. 29, 1988

[51] Int. Cl.⁴ .............................. G03B 17/52
[52] U.S. Cl. ........................... 354/21; 354/86
[58] Field of Search .................... 354/21, 86

[56] References Cited

U.S. PATENT DOCUMENTS

| | | | |
|---|---|---|---|
| 3,369,473 | 2/1968 | Bartlett | 95/89 |
| 3,739,701 | 6/1973 | Erlichman | 95/13 |
| 3,852,780 | 12/1974 | Augustin et al. | 354/86 |
| 4,273,852 | 6/1981 | Lange et al. | 430/209 |
| 4,360,260 | 11/1982 | Eloranta et al. | 354/304 |
| 4,568,167 | 2/1986 | Sorli | 354/304 |
| 4,610,520 | 9/1986 | Takahashi et al. | 354/86 |
| 4,736,215 | 4/1988 | Hudspeth et al. | 354/21 |

*Primary Examiner*—Michael L. Gellner
*Attorney, Agent, or Firm*—David R. Thornton; Alfred E. Corrigan

[57] ABSTRACT

A motor driven camera back for instant film carrying machine readable indicia representative of parameters of the film. The back includes a pair of processing rollers driven by a motor between an initial spaced relationship and an operative pressure nip relationship and also in rotation in the operating relationship to process and discharge an exposed film unit from the back. A sensor and motor control circuitry is provided so that upon initial withdrawal of film unit portions, information supplied to the circuitry by the film carried indicia will operate the motor only if the processing parameters of the film unit are suitable to those of the camera back.

16 Claims, 10 Drawing Sheets

PHOTOGRAPHIC APPARATUS FOR MOTORIZED PROCESSING OF INSTANT FILM

BACKGROUND OF THE INVENTION

This invention relates to photographic apparatus and, more particularly, it concerns a camera back construction for retaining a plurality of instant film units for successive exposure and subsequent processing of individual units under conditions assuring that the processing requirements for each film unit are fully met.

In U.S. Pat. No. 4,736,215, issued Apr. 4, 1988, a photographic method and apparatus is disclosed in which one or all film units in a packaging cassette carry machine readable indicia by which a variety of camera operating parameters may be adjusted in response to the indicia printed on at least one unit in a given cassette to assure that the unique characteristics of the film units in that cassette are fully accounted for in the resulting camera parameter adjustments. The system represented by the disclosed method and apparatus in that patent is particularly suited to instant film in which the quality of the ultimate photograph is dependent not only on camera exposure parameters, but also on processing variables as the exposed film unit is discharged from the cassette and the camera. Also, the disclosed system is applicable both to integral instant film which, by virtue of its construction, must be mechanically processed and discharged from the camera and to peel-apart instant film which is designed principally for manual withdrawal from the camera retained cassette and through a processing pressure nip for the spread of processing fluid between an exposed negative sheet and a positive sheet of each such film unit on which the resulting photograph is formed.

Although designed for manual removal from the camera during processing, photographs formed with peel-apart instant films are enhanced by automated or motor driven processing of such film units out of the greater degree of predictability in the operation of processing components on the film units as compared with manually pulling the film units in relation to such components. If the benefits of increased predictability of motor driven processors are to be fully realized, however, it is important that the film units and the processor operation be accurately correlated one with the other. For example, the optimum speed at which the film unit is passed through the pressure nip of the processor may vary considerably for different types of peel-apart film constructions. The normal forces acting on the superimposed negative and positive sheets of such a film unit at the processing pressure nip may vary to a degree where it may not be possible to process all types of peel-apart instant film in a given processor with satisfactory results. Also, because the withdrawal of a peel-apart instant film unit from the cassette in which it was packaged and through a processing pressure nip involves a succession of discrete steps, it is important that the various film unit components be properly positioned at the end of each such step of its movement if a motor driven processor is to be reliably effective. Other peel-apart instant film processing adjuncts, such as imbibition timers and the like similarly require adjustment to account for sensitometry and chemical variances of diverse film unit types. For these reasons and others, the system disclosed in the afore-mentioned patent, in which machine readable indicia is provided on each film unit, is particularly applicable to the provision of a motor driven processor for peel-apart instant films.

SUMMARY OF THE PRESENT INVENTION

In accordance with the present invention, an automated camera back is provided by which peel-apart instant film units supplied in a conventional packaging cassette may be exposed and processed by a motor driven processor in a manner facilitating control over several processing parameters as a result of printed machine readable indicia provided on each film unit.

The camera back is embodied in an enclosure having a hinged cover and base which close on each other and a packaging cassette of peel-apart film units so that the pull tabs of the film extend between the hinged units to be manually accessible in a trough formed in the base. A processor assembly is supported by the cover and includes a pair of processing rollers, a motor, a gear train connecting the motor with the processing rollers, a processing roller support structure linked to the gear train and by which the rollers are moved by operation of the motor from a spaced initial position toward each other to an operative position under a pressure nip bias, and a sensor positioned between the processing rollers and a slot form opening in the cover through which an exposed film unit is ejected from the back. The sensor is positioned to read indicia, such as a bar code, printed or otherwise provided on each film unit to be processed by the camera back and is incorporated in circuitry designed to initiate operation of the motor in response to information represented by the indicia to the senor as the leader portions of each film unit are withdrawn through the initially spaced rollers by a manual or machine driven pull on the unit pull tabs. Thus, if the film loaded in the back is not compatible with the processing parameters of the back or if a given film unit is not properly positioned with respect to the processing rollers after the pull tab has been manually or otherwise withdrawn, the film unit will not be processed by ejection from the camera back.

A principal object of the invention, therefore, is the provision of an automated camera back for instant film by which consistent processing and conformance of processing apparatus with a film unit to be processed is assured. A further object is the provision of an automated camera or camera back providing increased convenience for the user. Another object of the present invention is the provision of such a camera back which is particularly suited for use with commercial forms of peel-apart instant films. Other objects and further scope of applicability of the present invention will become apparent from the detailed description to follow taken in conjunction with the accompanying drawings in which like parts are designed by like reference characters.

DETAILED DESCRIPTION OF THE PREFERRED EMBODIMENT

Figure 1:
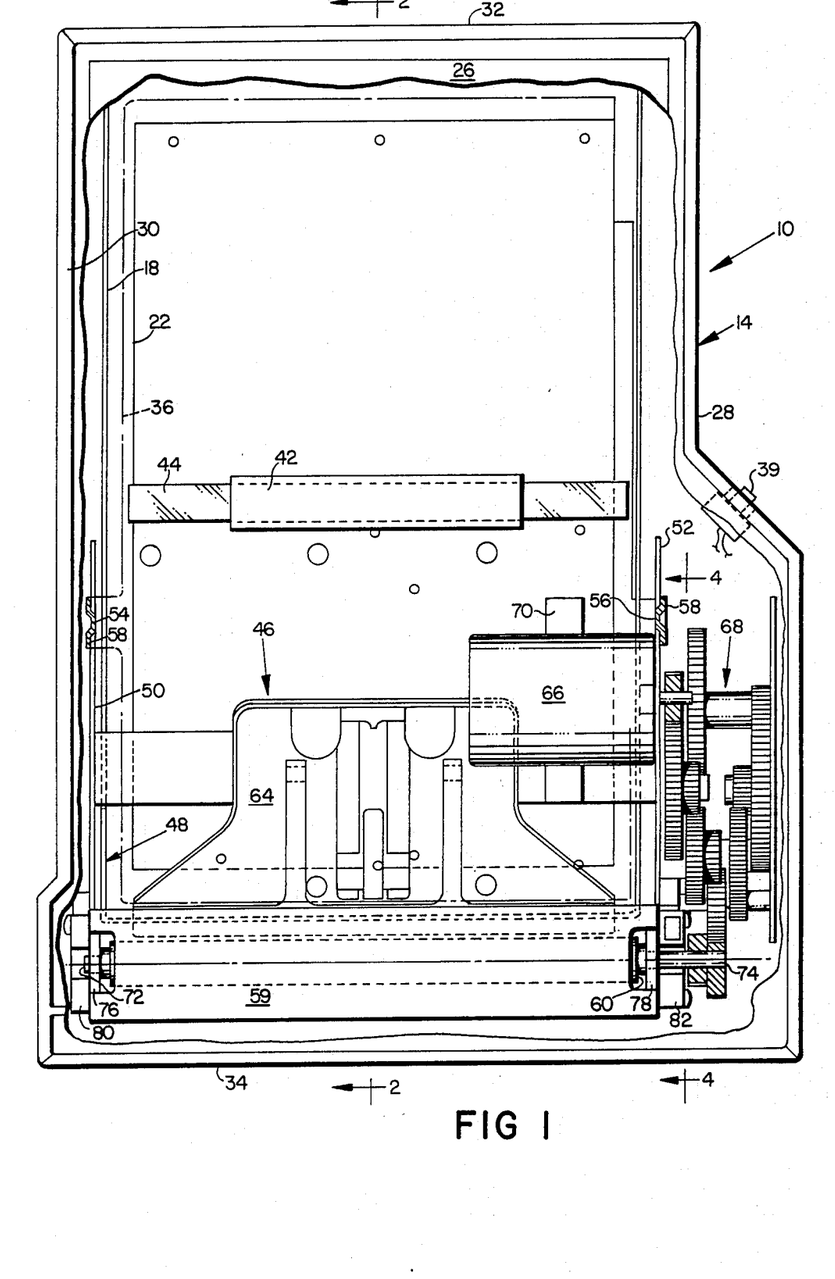
FIG. 1 is a cut away top plan view diagrammatically illustrating the motorized camera back of the present invention.
Figure 2:
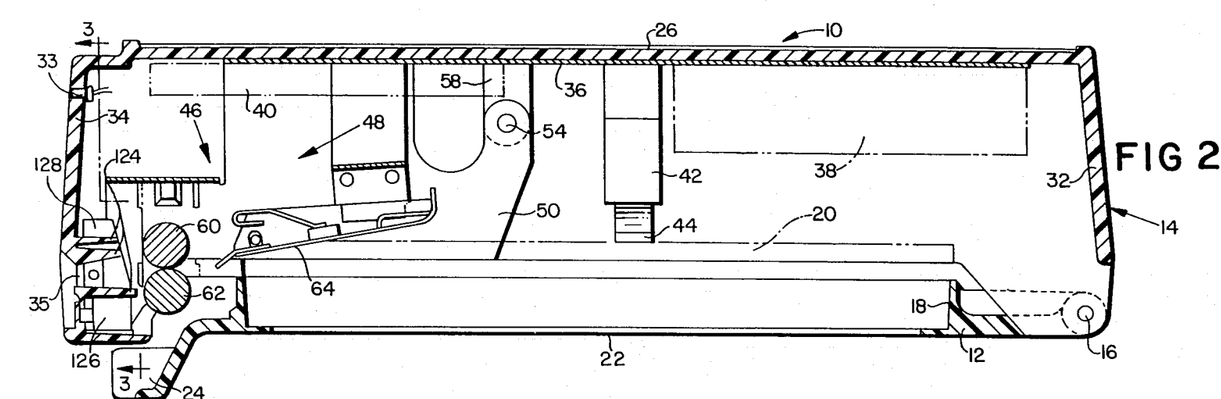
FIG. 2 is a cross-section on line 2—2 of FIG. 1.
Figure 3:
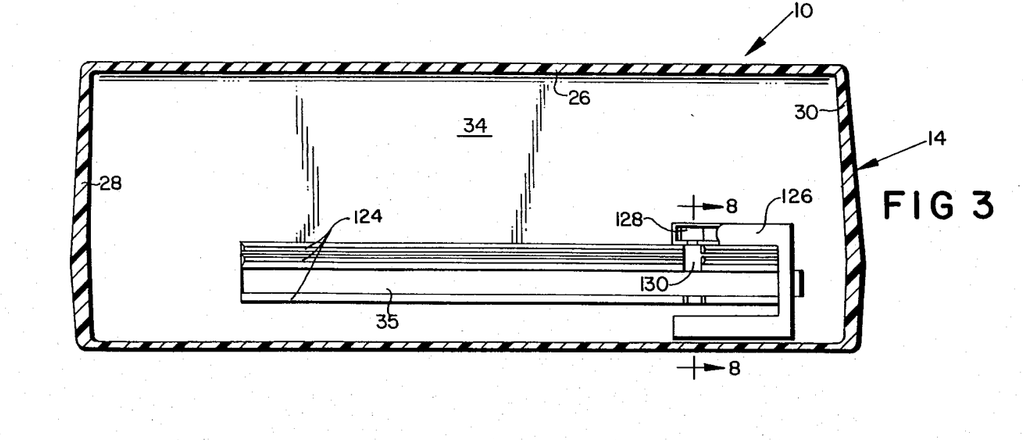
FIG. 3 is a cross-section on line 3—3 of FIG. 2.

In FIGS. 1-3 of the drawings, the motorized camera back of the present invention is generally designated by the reference numeral 10 and shown to include a forwardly disposed housing portion or base 12 (FIG. 2) to which a rear housing portion or cover 14 is pivotally connected by a hinge 16 at one end. The base 12 is shaped to define a generally rectangular recess or well 18 to receive a packaging cassette 20 adapted to contain a plurality of peel-apart instant film units in a manner well known in the art. The bottom of the well 18 has an open rectangular exposure window 22 through which film units contained in the cassette 20 are exposed. The end of the base 12 opposite the hinge 16 is shaped to establish a pull tab trough 24 also in conventional fashion. The back 10, as illustrated and described herein, is of a type adapted to be mounted on and removed from a separate camera housing as disclosed, for example, in U.S. Pat. No. 3,852,780, issued to Rolf M. Augustin, Jr. et al. However, it is contemplated and will be understood by those skilled in the art that with very minor modifications, the back 10 may be incorporated as a permanent part of a camera of the general type exemplified by the disclosures of U.S. Pat. Nos. 3,270,643 issued to B. Fernald or 3,899,337 issued to John W. Nestor, Jr.

The operating components of the back 10 are supported within the rear housing portion or cover 14 which is capable of pivotal movement away from the base 12 to load the cassette 20 into the well 18 and for maintenance. As shown most clearly in FIGS. 2 and 3 of the drawings, the cover 14 includes a relatively large, generally rectangular back wall 26, side walls 28 and 30 and end walls 32 and 34, the end wall 34 carrying one or more imbibition signal lamps 33 and having an elongated opening or slot 35 through which a film unit is discharged after exposure. A supporting frame plate 36 is secured to the inside surface of the back wall 26 by suitable means such as rivets, screws or the like (not shown) and supports a battery pack 38, an electronic circuit panel 40 and a depending spring block 42 to which a cassette retaining leaf spring 44 is fixed. Also, a processor assembly 46 including a frame 48 having a pair of side walls 50 and 52 is removably secured to the frame plate 36 in part by detent hinges 54 and 56 located on tabs 58 depending from opposite sides of the frame plate 36. The side walls 50 and 52 are connected by an integral bridge plate 58 at the ends of the side walls 50 and 52 nearest the end wall 34 of the cover 14. As illustrated in FIG. 2, the back 10 includes a battery pack 38 as a source of power, however, it should be understood that it may alternatively provide a coupling for connection to a separate power source, such as the source of the host camera (not shown). A manually operative slide switch 39 is mounted in the side wall 28 to control the energization of the camera back 10 by the battery 38 as later explained in detail with regard to FIGS. 10 and 11.

The major working components of the processor assembly 46 are shown in FIGS. 1 and 2 to include a pair of processing rollers 60 and 62, an inclined side guide assembly 64, a motor 66 and a gear train 68 for transmitting power from the motor 66 to the rollers 60 and 62. The motor is supported by strap bracket 70 (FIG. 4) from the frame plate 36, whereas all other mechanical components of the processing assembly 46 are supported from the frame 48.

In FIG. 1, it will be noted that the roller 60 includes shaft extensions 72 and 74 at opposite ends and which are journalled respectively in bearing blocks 76 and 78 secured in the frame 48. Also, the shaft extensions 72 and 74 overlie cam block retainers 80 and 82 secured to the outside of the frame walls 50 and 52, respectively. A more complete understanding of the supporting structure for the rollers 60 and 62 may be had by reference to FIGS. 4 and 5 of the drawings.

Figure 5:
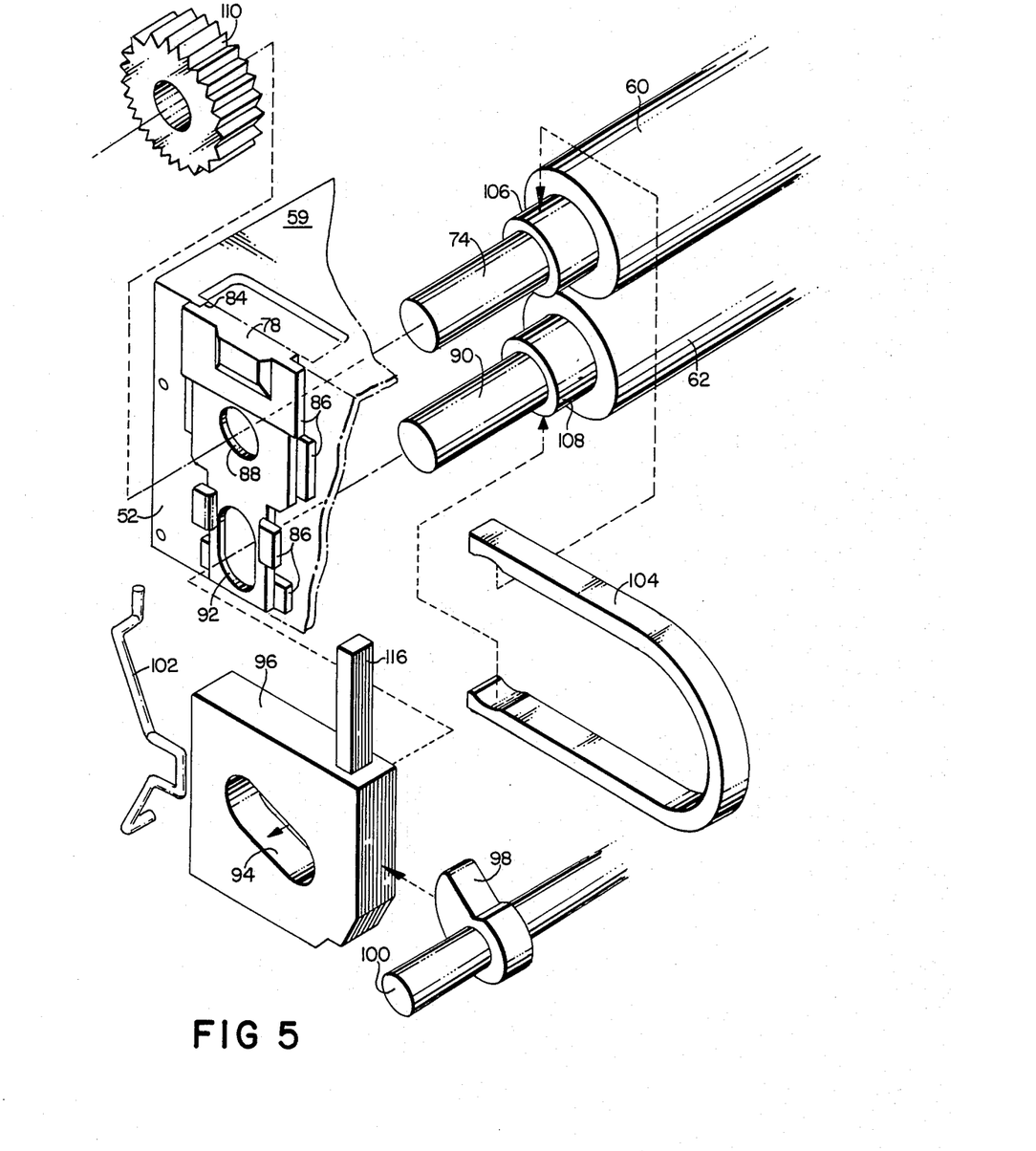
FIG. 5 is an exploded perspective view illustrating the processing roller support components of the invention.

In FIG. 5, the structural components for supporting one end of the processing rollers 60 and 62 are shown most clearly, it being understood that with the excecption of drive gearing, which is operative at only one end of the rollers as shown in FIG. 1, the same supporting components are duplicated at opposite ends of the rollers 60 and 62. Thus, it will be seen in FIG. 5 that the bearing block 78 is shaped to be retained in a slot 84 in the processor frame side wall 52 as a result of laterally offset tabs 86 struck out from the opposite side edges of the bearing block. The shaft extension 74 of the roller 60 extends through and is journalled for rotation in a circular bearing race 88 in the block 78. The other roller 62 is similarly formed with a shaft extension 90 to be received for rotation and limited translational movement in a slot form bearing race 92. The shaft extension 90 also extends through a slot shaped camming recess 94 in a translatable cam block 96 in turn supported for sliding movement in the cam block retainer 82 identified above with respect to FIG. 1 and which is secured to the outside of the wall 52. The cam block 96 is located between a rotatable actuating cam 98 keyed for rotation with a cam actuating shaft 100 and a cam block return spring 102 secured to the side wall 52. As a result of this organization, it will be seen that while the axis of the roller 60 is fixed as a result of the circular bearing race 88, the axis of the roller 62 may be moved toward and away from the axis of the roller 60 very accurately under control of the position of the cam block 96 as determined by the cam 98 and return spring 102.

The cam slot 94 in the block 96 is of a width larger than the diameter of the shaft 90 so that only the upper surface of the slot 94 is operative as a camming surface to position the axis of the roller 62. The two rollers 60 and 62 are normally biased toward one another in the illustrated embodiment under a force exerted by a hairpin spring 104 engageable with enlarged circular bosses 106 and 108 positioned between the ends of the rollers 60 and 62 and the shaft extensions 74 and 90 thereof, respectively. Thus, the force exerted at the nip between the two rollers 60 and 62 is determined by the springs 104 at opposite ends of the rollers, whereas movement of the cam block 96 will urge the rollers out of nip contact pressure with respect to each other, against the bias of the spring 104 to a spaced relationship depending on the position of the block 96.

In FIG. 5, a gear 110 is illustrated and is adapted to be keyed or otherwise rotatably coupled with the shaft 74 of the roller 60. The gear 110 is part of the gear train 68 to be described in more detail with reference to FIG. 4, but it should be noted here that the gear 110 is of an effective or pitch diameter the same as the diameter of the roller 60. While not shown in FIG. 5, a similar meshing gear is attached to the shaft 90 of the roller 62 so that when the rollers 60 and 62 are closed against each other, relative rotation is by gear mesh with driving torque supplied through the gear 110 by means of a gear 113 joined thereto (see FIG. 4).

Figure 4:
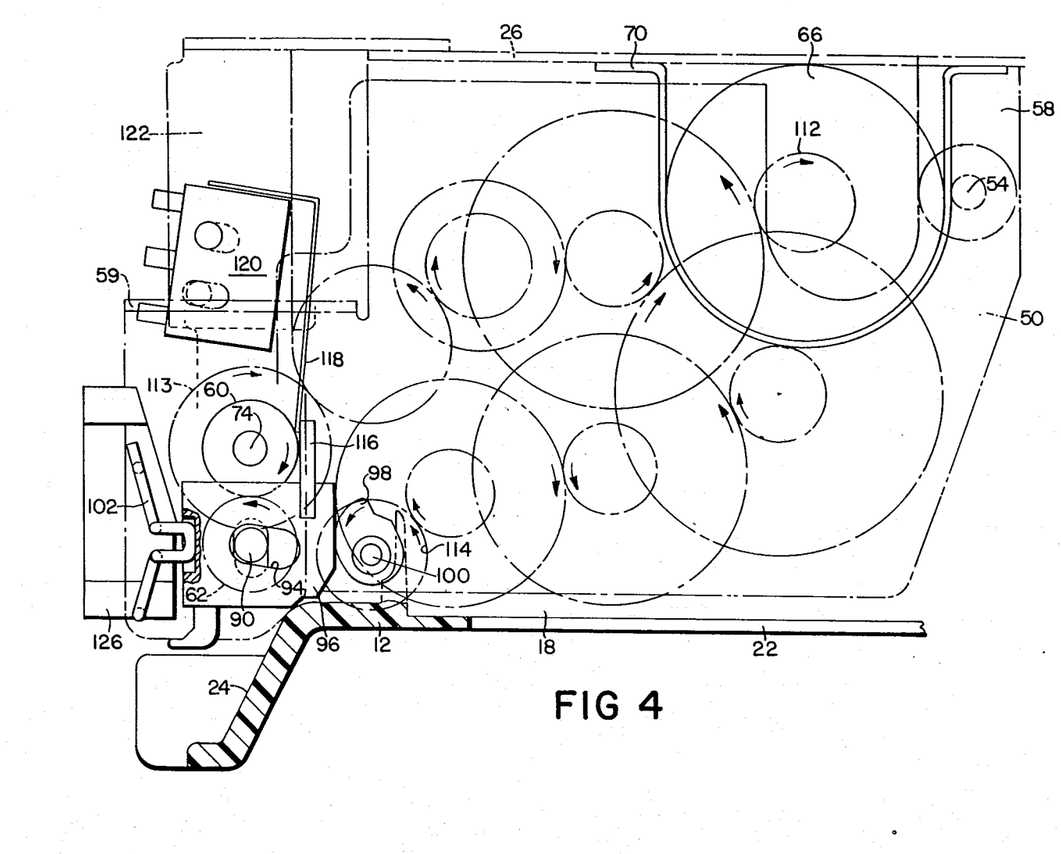
FIG. 4 is an enlarged fragmentary cross-section on line 4—4 of FIG. 1.

In FIG. 4, the gear train 68 is shown in largely schematic form with relative gear pitch diameters represented by dashed-line circles and mesh points represented by arrow pairs pointing in the direction of individual gear rotation. Thus, from the illustration in FIG. 4, (see also FIG. 1), it will be seen that the gear train 68 includes separate reduction paths between a motor drive gear 112 and the gear 110 keyed to the roller shaft 74, on the one hand, and between the motor drive gear 112 and a gear 114 keyed to the cam shaft 100, on the other hand. The overall reduction in these repective gear paths is selected so that upon twenty (20) revolutions of the rollers 60 and 62 necessary to eject and process a film sheet from the cassette 20, the cam shaft 100 and cam 98 will undergo one complete revolution. The manner in which this operation of the rollers 60 and 62 and of the cam 98 operates in practice will be described in more detail below.

As may also be seen in FIGS. 4 and 5, the cam block 96 is provided with an upstanding post 116. As shown in FIG. 4, the post 116 is positioned to engage an actuating arm 118 of a microswitch 120. The microswitch 120 is supported in an adjustable fixed position from a bracket 122 secured to the frame plate 26.

In FIGS. 2 and 3, the film unit discharge opening 35 is shown to include inwardly projecting flanges 124 on opposite sides thereof. A sensing module 126 is shown in FIG. 3 as extending about one end of these flanges to support a sensing element 128 in line with a gap 130 in the flanges 124, thus downstream from the rollers 60 and 62 in the context of sheet feed through the pressure nip of the rollers. Alternatively, the sensing element 128 may be positioned just upstream of the rollers 60 and 62.

Although the apparatus of the present invention is intended for use with commercially available instant film of the type commonly referred to as "peel-apart" film, an understanding of the construction of this film and the manner in which it is withdrawn from a packaging cassette is important to a full appreciation of the present invention. Thus, in FIGS. 6 and 7 of the drawings, a peel-apart film unit 132 is shown to include a photographic negative sheet 134, a photographic positive sheet 136, a negative leader 138, a positive leader 140 and a pull tab 146 releasably attached to the underside of the negative leader 138. The negative sheet 134 has light sensitive coating or active surface 142 on one side, whereas the positive sheet 136 is similarly provided with an active or image receiving surface 144. The negative leader 138 includes a relatively wide trailing end portion 148 fixed to the leading edge of the negative sheet 134 and tapers to a pull portion 150 at its leading end. The positive leader 140 includes a mask portion 152 having a rectangular opening 154 to delineate the image area of the positive 136. The leader 140 also tapers to its leading edge 156 which is secured to the pull portion 150 of the negative leader 138. A frangible pod 158 of processing fluid suported by the negative leader 138 in a position spaced forwardly of the leading edge of the negative sheet 134.

Figure 7:
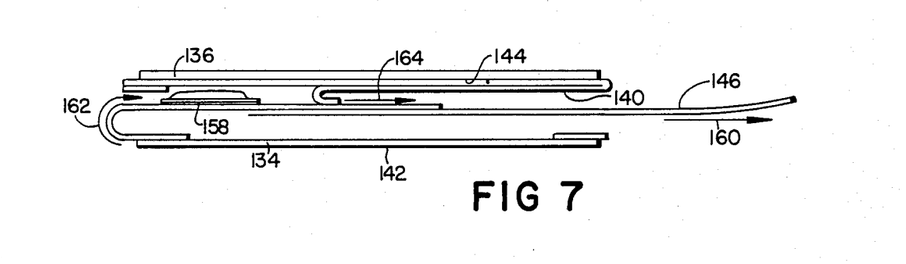
FIG. 7 is a side elevation illustrating the film unit of FIG. 6 in essentially the position in which it is mounted in a packaging cassette.

The configuration of the unit 132 contained in a packaging cassette is essentially as shown in FIG. 7. For a complete disclosure of such a cassette, reference may be made to U.S. Pat. Nos. 3,479,184 issued to E. H. Land et al and 3,899,337 issued to J. W. Nestor, Jr. Thus, in the cassette, the positive leader 140 is folded back on itself to underlie the positive sheet 136. The negative leader 138, on the other hand, extends in continuous fashion through a bite so that the negative sheet 134 is arranged with its active surface 142 facing downwardly. The pull tab 146 extends forwardly and out through the leading edge of the packaging cassette to a position to be manually grasped from the exterior of a camera or the camera back 10 of the present invention in a manner to be described. From FIG. 7 it will be seen that a pulling action on the pull tab 146 to advance it in the direction of the arrow 160 will pull the negative sheet 134 through the bite in the direction of the arrow 162 to a position underlying the positive sheet 136. At the same time, the positive leader 140 is withdrawn from its folded condition in the direction of the arrow 164 so as to extend in coextensive overlying relationship with the pull portion 150 of the negative leader 138.

Figure 6:
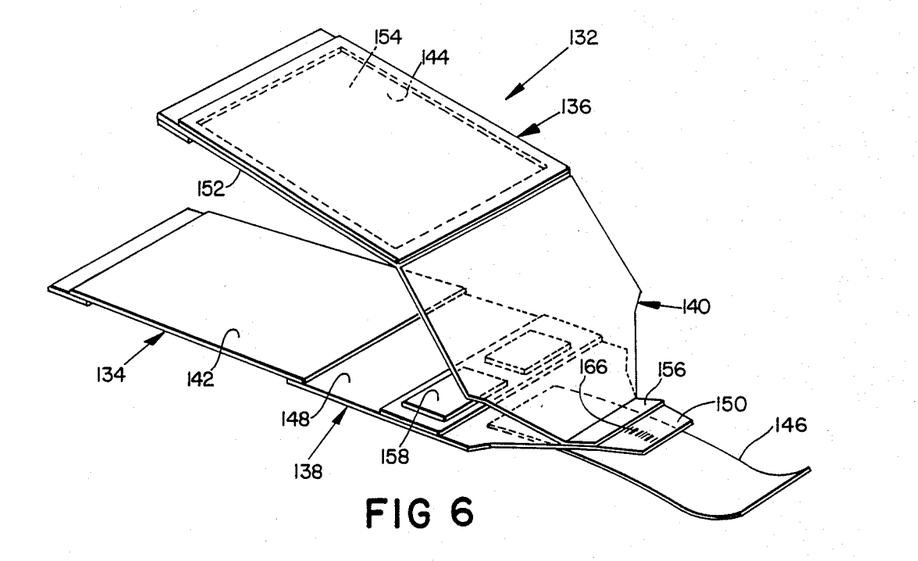
FIG. 6 is a perspective view illustrating the components of a peel-apart instant film unit used in the camera back of the present invention.

In FIG. 6, it will be seen that the pull portion 150 of the negative leader 138 is provided on one side with a bar code strip 166. The bar code 166 is affixed to or printed on the leader 138 and represents machine readable indicia corresponding to various exposure and processing parameters of the film unit 132. As will be seen from the following description of operation of the present invention, parameters relating to the specific film unit 132 are represented by the bar code 166 on that unit. On the other hand, and as disclosed in the aforementioned U.S. Pat. No. 4,736,215, the bar code may additionally or alternately contain information applicable to the parameters of a successive film unit to be exposed in the cassette containing multiple film units including the specific unit 132.

Figure 10:
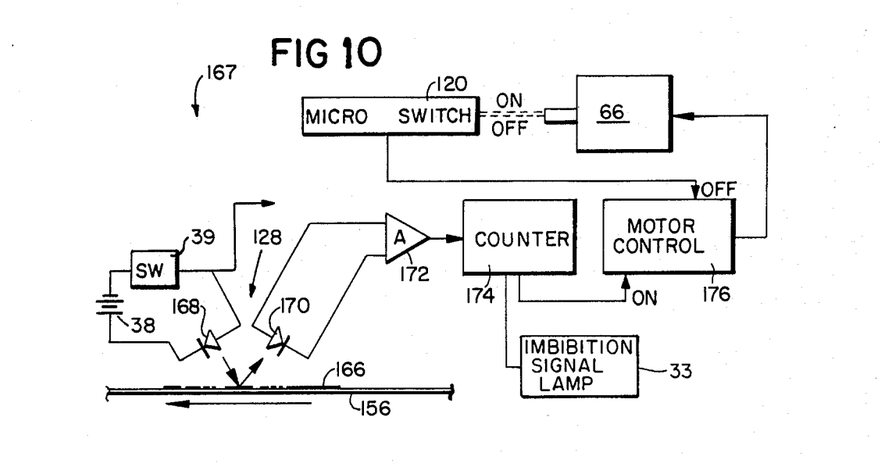
FIG. 10 is a block diagram illustrating major electronic components used in the preferred embodiment of the invention.

As shown in FIG. 10 of the drawings, the switch 39 the motor 66, microswitch 120 and sensor 128 are included in an electronic circuit 167 by which operation of the motor may be controlled in response to information read by the sensor 128. In FIG. 10, the sensor 128 is represented by a light-emitting photodiode 168 and a light responsive photosensor 170 such that light pulses read by the photosensor 170 are fed to an amplifier 172, a counter 174 and a motor control 176. The components of the circuit 167 are coupled to the battery pack 38 by the switch 39 which is manually turned on by the operator at the start of a picture taking sequence. Alternatively, a sensor switch (not shown) may be automatically turned on when the film pack 20 is inserted into the back 10 or, in response to initiation of an exposure cycle to expose the negative of a film unit 132 in the cassette 20. Thus, the switch 39 powers up the sensor 128 and provides energy to other elements of the circuit while the sensor actually initiates processing in a manner that will be understood from the description to follow. That is, while the counter 174 may supply signals to exposure control circuitry other than the motor control 176, it is important from the standpoint of the present invention that the counter respond to signals contained in the bar code 166 and read by the photosensor 170 to turn the motor control ON or otherwise to initiate operation of the motor 66. The motor control is then turned OFF by the microswitch 120 as a result of operation of the latter switch by the cam 98 in a manner to be described. Hence, the signal received through the counter 174 from the sensor 128 to turn the motor 66 ON will override the OFF condition initially supplied to the motor control by the microswitch 120.

With reference again to FIG. 4 of the drawings, it will be noted that in the position of the cam block 96 and of the cam 98 as illustrated in FIG. 4, the spring 102 has moved the cam block 96 so that the rollers 62 and 64 are brought against each other by the springs 104 (FIG. 5) which estblished the pressure at the nip between the rollers 60 and 62. This condition assumes that the motor 66 is in operation and that a processing cycle is underway. At the end of each processing cycle and, correspondingly, at the initiation of a new processing cycle, the cam 98 is positioned to advance the cam block 96 against the spring 102 so that the roller 62 is drawn away from or spaced from the roller 60. It is also to be noted that in this position of the cam block 96, the post 116 on the block 96 engages the microswitch arm 118 to place the microswitch 120 in an OFF condition. As a result and because of the circuitry shown in FIG. 10 of the drawings, the motor 66 will not be operated until the motor control 176 is turned ON through the counter 174 as a result of signals read by the photosensor 170 from the bar code 166 on the positive leader 156 of a film unit 132. Further, when operation of the motor 66 is initiated, the cam 98 is rotated to a position in which the cam block 96 is moved by the spring 102 to the position illustrated in FIG. 4. In the position illustrated in FIG. 4, the microswitch 120 is in its ON state and the rollers 60 and 62 are urged against each other by the springs 104 with the gears 110 and 113 at one end of both rollers now in full meshing engagement. Because of the reduction paths of the gearing 68, the cam 98 will rotate through only a single revolution during the twenty (20) revolutions of the processing rollers so that at the end of a processing cycle, the cam block is again moved against the spring 102 to bring the roller 62 out of contact with the roller 60 and to turn the microswitch 120 to an OFF condition thereby shutting OFF the motor 66. Consequently, the motor control 176 turns ON the motor 66 while the microswitch turns OFF the motor.

Figure 8:
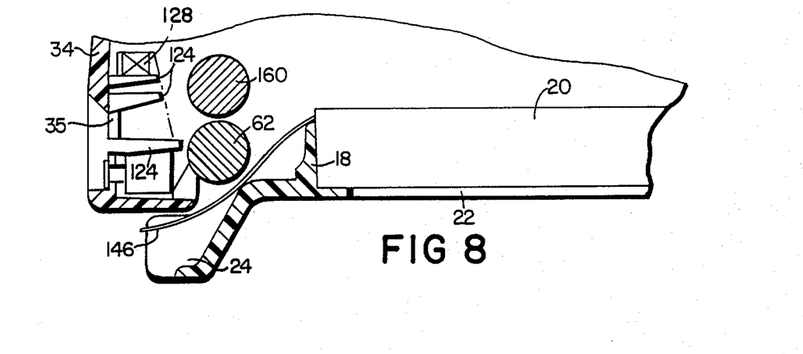
FIG. 8 is a fragmentary cross-section on line 8—8 of FIG. 3 illustrating orientation of components prior to processing.
Figure 9:
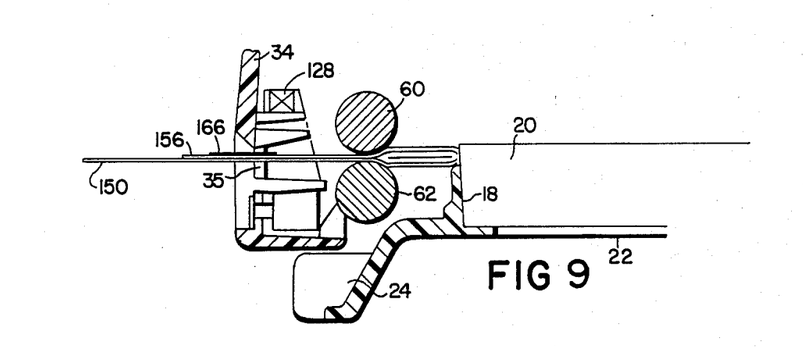
FIG. 9 is a fragmentary cross-section similar to FIG. 8, but illustrating the components in a different phase of processing operation.

The effect of the described operation on a film unit may be understood with reference to FIGS. 8 and 9 of the drawings. In FIG. 8, it will be noted that the rollers 60 and 62 are spaced from each other and that the pull tab 146 of a film unit 132 to be exposed within the cassette 20 extends within the trough 24 to a position in which it may be grasped manually. Upon exposure of the film unit 132 (FIG. 6) to which the tab 146 is releasably attached, the pull tab 146 is pulled in conventional manner so that the pull portion 150 of the negative leader 138 and the leading end portion 156 of the positive leader 140 are presented in the exit opening 35 essentially in the position illustrated in FIG. 9 of the drawings. In this condition, the leaders 138 and 140 will have passed through the nip of the rollers 60 and 62 which still remain in a spaced condition. Also, it will be noted that the bar code 166, in this condition, will have passed under the sensor 128. As a result of information read by the sensor 128, it will signal the motor control 176 by means of the counter 174 to turn on the motor 66 in a manner to rotate the cam 98 allowing the microswitch to move to its ON condition, the roller 62 to be urged toward the roller 60 under the force of the springs 104, and to rotate the rollers to engage the leaders 138 and 140 and drive the film unit 132 through the exit opening 35. As a result, the pod 158 is ruptured and the processing fluid contained therein is spread uniformly between the now overlying positive and negative sheets of the film unit 132. In the present embodiment, the specific imbibition period of the film is included in the bar code 166 and also read by counter 174 to provide illumination of the imbibition signal lamp 33 so as to signal completion of the imbibing time. It is understood, of course, that other signal arrangements such as audio, may also be provided, and multiple devices included to permit signaling of the imbibition time of successive film units.

It will be noted that in the event the information read by the sensor 128 from the bar code 166 does not conform with the logic circuitry of the back 10, as for example when the imbibition value is not within specifications or not readable, etc., the motor 66 will not be turned on to process and eject the film unit. When this occurs, the operator is informed either that the type of film contained in the back 10 is not in conformance with parameters of the processing apparatus in the back 10 or that the leaders 138 and 140 are not positioned between the rollers 60 and 62. If the leaders are so positioned and visible at the slot 35, the operator knows that the type of film inserted is not compatible with the back 10 and that the cassette 20 must be replaced with the correct film. If for some reason, such as an improper manual pull on the tab 146 or a premature release of the pull tab 146 from the negative leader 138, the leaders did not advance through the nip of the rollers 60 and 62, then the operator will be required to remove the exposed film unit and expose the next film unit in the cassette 20 to the subject of interest. Additionally, and while not illustrated in the drawings, the back may be provided with a pack engaging switch arrangement to initialize or reset the camera back when a new pack is inserted.

Figure 11:
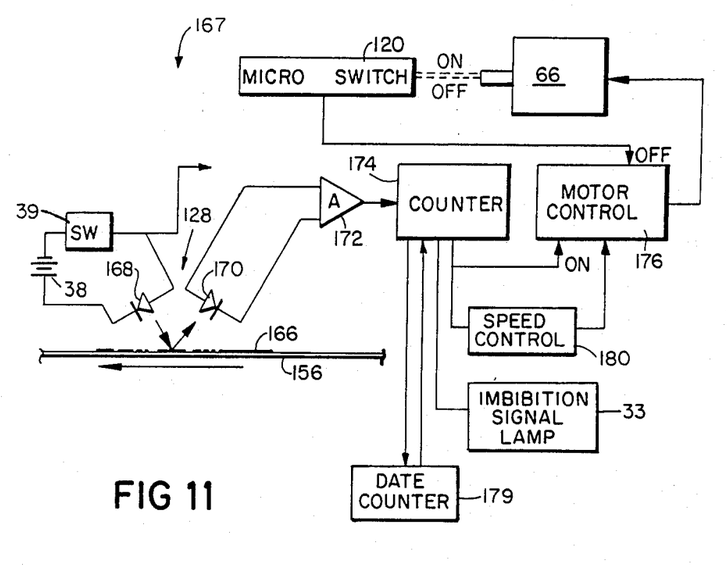
FIG. 11 is a block diagram illustrating electronic components of another embodiment.

Information relating to various aspects of the film unit may, of course, be included in the bar code 166, and the back made to functionally operate in accordance therewith. For example, as shown in FIG. 11, the back may include a date counter 179 for comparison with a film date carried in a bar code 166 to vary the time of the imbibition signal lamp 33 and/or alter the speed of motor 66 by means of a speed control 180 in accordance with the age of the film and further to preclude motor operation when any of the parameters are without prescribed specifications, including the age of the film.

As described in regard to FIGS. 1–5, the rollers 60 and 62 undergo twenty (20) revolutions as the cam 98 undergoes a single revolution. In the above-noted embodiment, this difference is accomodated by dual gear trains extending from the motor 66. An alternate arrangement is shown in FIGS. 12–14, wherein elements similar to those shown in FIGS. 1-5 are designated with the same identical numbers respectively, but with the addition of a prime.

Figure 12:
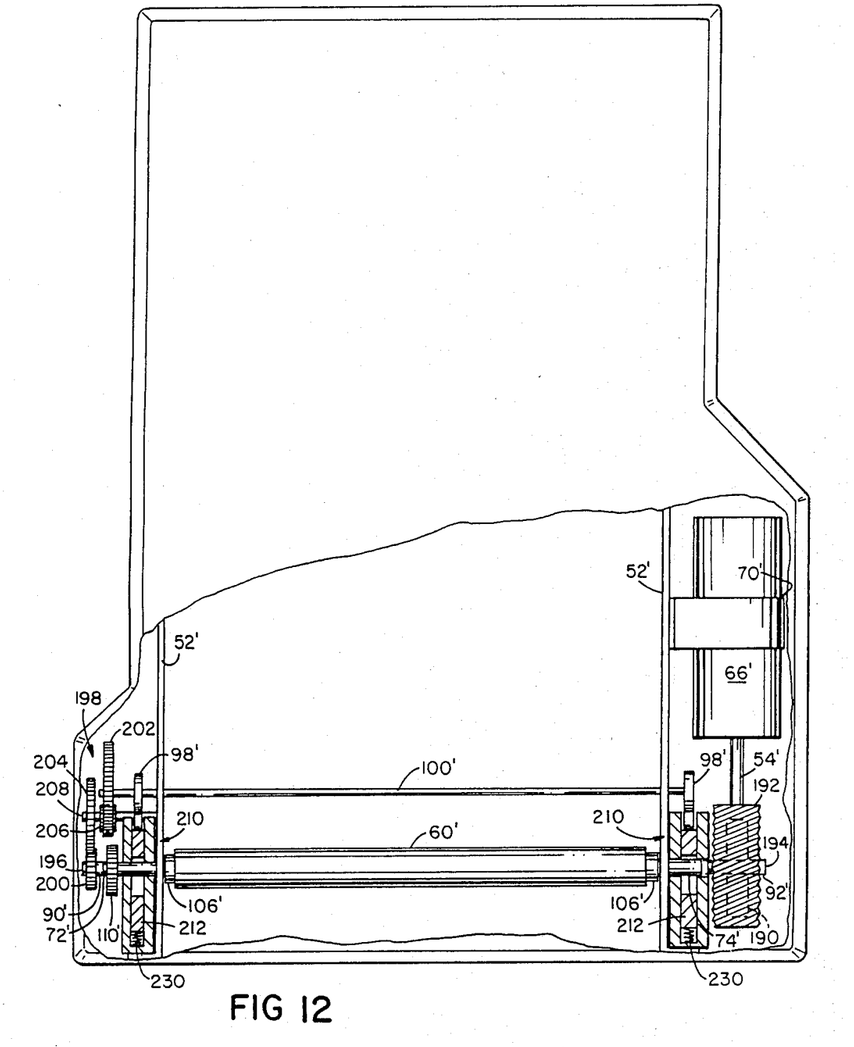
FIG. 12 is a diagrammatic top plan view of the roller drive arrangement of an alternate embodiment of the present invention.
Figure 13:
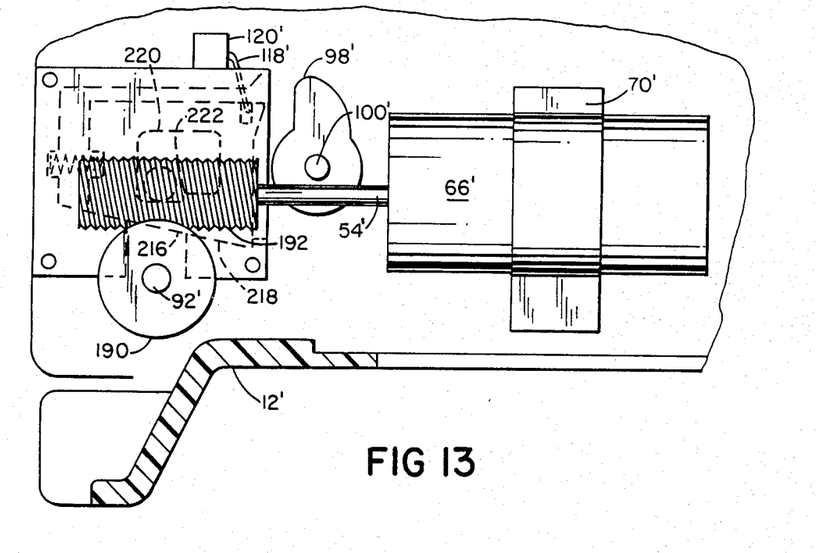
FIG. 13 is an enlarged fragmentary side view of the roller drive arrangement illustrated in FIG. 12.
Figure 14:
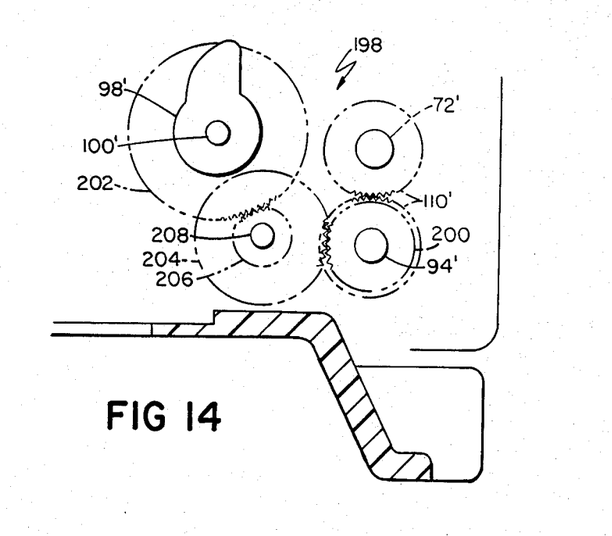
FIG. 14 is an enlarged fragmentary side view of the cam drive arrangement illustrated in FIG. 12.

In the embodiment of FIGS. 12-14, the extension 92' (of the lower roller 62', not seen in these figures) carries a worm gear 190. The latter, in turn, is directly driven by a worm 192 from the shaft 54' of the motor 66' which is mounted with its longitudinal axis parallel to the exit path of the film.

Unlike the prior embodiment as shown in FIG. 5 where upper roller 60 is journaled for rotation only (in bearing 88) and the lower roller 62 journaled for both rotation and translation toward the upper roller (in bearing 92), in the present embodiment, the bottom roller 62' is journaled for rotation only and the upper roller 60' is journaled for both rotation and translation. This is accomplished by means of a bearing arrangement identical to the bearings shown in FIG. 5, but with position of the journals transposed, mounted in or affixed to the frame walls 50' and 52' of FIG. 12. Springs 104, as shown in FIG. 5, or other spring arrangements, are employed to bias the translatable upper roller 60' toward the lower roller 62'.

Thus, in addition to simplifying the gear train arrangement, a thinner and more compact camera back is provided as illustrated in FIGS. 12-14 by mounting the motor in worm drive arrangement with and just over the lower roller such that the motor thickness can be essentially accomodated in the overall height of the roller arrangement.

In this arrangement, the motor 66' drives one end 194 of the rotatable lower roller 62' by means of the worm gear 190 affixed to the extended shaft extension 92'. The other end 196 of the bottom roller 62' is geared to and drives the upper roller 60' through a pair of mesh gears 110' and 113' (only the upper gear 110' being shown in FIG. 12) and a gear reduction train 198. The gear reduction train 198, as shown more clearly in FIGS. 12 and 14, includes a drive gear 200 mounted on the roller extension 90' for rotation therewith and a cam drive gear 202 fixed to the cam shaft 100'; these gears being intercoupled by means of intermediate gears 204 and 206 to provide a twenty-to-one gear reduction between the rollers and the cams 98' such that the latter produces one revolution during film processing. The intermediate gears 204 and 202 are fixedly mounted for common rotation on a shaft 208, which is journaled in the frame wall 50'.

A cam block assembly 210, comprising a cam block 212 retained within a cam block housing 214, is mounted to each of the frame walls 50' and 52' respectively. In this embodiment, the cam block 212 includes an inclined lower edge 216 which rides on an inclined edge 218 of the housing 214. Further, the block 212 includes an opening 220 having a stepped lower edge 222 designed to engage the shaft extension 74'. Each cam block housing 214 is split into sections 224 and 226 along the plane of the cam block 212 to allow assembly of each housing to retain its cam block and to mount each housing to its adjoining frame walls 50' and 52'. On opening 228 is carried in each housing 214 to allow engagement of the cam 98' with its associated cam block 212 and engagement with the microswitch 120'. Finally, each cam block assembly 210 includes a cam spring 230 arranged to bias its respective cam block into cam follower engagement and in the direction of reduced roller gap.

The operation of the embodiment of FIGS. 12-14 is essentially the same as that described with regard to the prior embodiment. Thus, with reference to FIG. 13 of the drawings, it will be noted that in the position of the cam block 212 and of the cam 98' as illustrated in FIG. 13, the cam spring 230 has moved the cam block 212 so that the rollers 62' and 64' are allowed to move toward each other by the roller spring which establishes the pressure at the nip between the rollers 60' and 62'. This condition assumes that the motor 66' is in operation and that a processing cycle is underway. At the end of each processing cycle and, correspondingly, at the initiation of a new processing cycle, the cam 98' is positioned to advance the cam block 212 against the cam spring 230 so that the roller 62' is drawn away from or spaced from the roller 60'. It is also to be noted that in this position of the cam block 212, it engages the microswitch arm 118' to place the microswitch 120' in an OFF condition. As a result and because of the circuitry shown in FIG. 10 of the drawings, the motor 66' will not be operated until the motor control 176 is turned ON through the counter 174 as a result of signals read by the photosensor 170 from the bar code 166 on the positive leader 156 of a film unit 132. Further, when operation of the motor 66' is initiated, because of the gear reduction train 198, the cam 98' will rotate so that at the end of a processing cycle, the cam block is again moved against the spring 230 to bring the roller 62' out of contact with the roller 60' and to turn the microswitch 120' to an OFF condition.

Consequently, as in the prior embodiment, the rollers 60' and 62' are initially spaced from each other. Upon exposure of the film unit 132 (FIG. 6) to which the tab 146 is releasably attached, the pull tab 146 is pulled in conventional manner so that the negative leader 138 and the leading end portion 156 of the positive leader 140 are presented in the exit opening 135 essentially in the position illustrated in FIG. 9 of the drawings. In this condition, the bar code 166 will have passed under the sensor 128. As a result, information will have been supplied to the motor control 176 to turn on the motor 66' in a manner to rotate the rollers 60' and 62' and to drive the cam 98' to allow the cam block to move to its roller disengaged position as shown in FIG. 13, thereby allowing the roller 62' to be urged toward the roller 60' to engage the leaders 138 and 140 and drive the film unit 132 from the camera back. Upon completion of twenty turns of the rollers 60' and 62', the cams 98' rotate back to an initial position now shown in FIGS. 12-14 in which the cam blocks 212 are moved forwardly to raise the roller 60' and reset the microswitch 120' to its OFF condition.

While the illustrated embodiments have been directed to arrangements employing machine readable indicia carried on the film leader portion which can preclude motor operation either when the read parameters are incompatible with the desired film back operation or when the leader is not properly positioned in the roller gap, the indicia may alternately be placed on other film areas as set forth in the above-noted U.S. Pat. No. 4,736,215. Moreover, allthough the invention is particularly suited to peel-apart film, it can, of course, be applied to integral film units.

Figure 15:
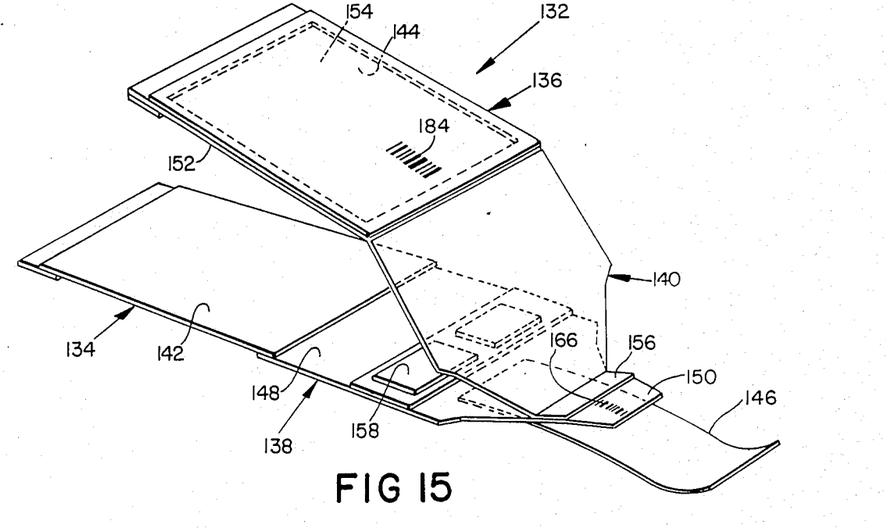
FIG. 15 is a perspective view of peel-apart instant film illustrating an alternative bar code arrangement.

More than one bar code may also be utilized in the camera back of the present invention, as illustrated in FIG. 15 wherein the bar code 166 is retained upon the pull portion 150 of the leader 138 and an additional bar code is carried on the positive sheet 136. Preferably, both bar codes 166 and 184 are positioned and arranged to be read by the sensor 128 as the film unit 132 is advanced; however, the additional bar code 184 could be positioned in any suitable location for reading, during movement, by its own sensor (not shown).

Advantageously, by providing two distinct bar codes, more information can be provided to the system and the information more specifically related to portions of the film unit. Thus, for example, the bar code 166 located on the pull portion 150 can carry information related to the overall film unit such as film type and unit date, whereas the bar code 184 can provide information specifically related to the positive, for example, the precise imbibition time, exposure value or other value necessary for provision of a suitable image. Since the positive is manufactured at a time different from unit assembly, the positive can be separately labeled with its own bar code 184, including the date of its manufacture if desired, and a further bar code 166 located on the negative at its manufacture or upon assembly of the complete unit.

As described herein, the manual withdrawal of the pull tab initiates operation as a result of leader movement and the reading of the bar code; however, it should be borne in mind that the system may be fully automated by providing machine withdrawal (not shown) of the pull tab in response to exposure operations.

Thus, it will be seen that as a result of the present invention, a highly effective camera back is provided by which the stated objectives, among others, are completely fulfilled. It is contemplated and will be understood by those skilled in the art from the preceding description and accompanying drawing illustrations, that modifications and/or changes may be made in the disclosed embodiment without departure from the present invention. It is expressly intended, therefore, that the foregoing desription and accompanying drawings are illustrative of a preferred embodiment only, not limiting, and that the true spirit and scope of the present invention be determined by reference to the appended claims.

What is claimed is:

1. In a camera back for processing an instant film unit having a leader, processing fluid carried by said film unit for processing of said film unit upon advancement of said film unit through pressure applying processing rollers, and a pull tab releasably attached to said leader and extending to the exterior of the camera back, the camera back including a pair of processing rollers defining a nip through which said leader and said unit are advanced from the camera back in a direction of feed to apply processing fluid across said film unit, said leader being advanced in the direction of feed to the nip of said rollers upon pulling of said tab, said leader first exiting the camera back as a leading end portion of said unit in the context of said direction of feed, the improvement wherein:

said processing rollers being mounted for rotation with at least one of said rollers being also mounted for translation toward the other roller, and said rollers are adjustable for movement between an initial position in which the rolling surfaces thereof are spaced from each other at said nip and an operating position in which the rolling surfaces thereof are biased toward one another at said nip, and further comprising:

machine readable indicia carried on said leading end portion of said film unit;

drive means for adjusting said processing rollers between said initial and operating positions and for driveably rotating said rollers in said operating position to advance said film unit in said direction of feed;

sensor means for developing signals in response to information supplied by said machine readable indicia as said leader is advanced by pulling of said tab; and control means for initiating operation of said drive means in response to predetermined signals supplied by said sensor means whereby upon pulling of said tab, the sensor develops signals from said indicia and through said control means operates said motor to adjust said rollers to their operating position and to rotate said rollers to advance said film unit.

2. The camera back of claim 1 wherein said sensor is located downstream from said rollers in the context of said direction of feed.

3. The camera back of claim 2 wherein said machine readable indicia is carried on said leader in a position to be read by said sensor before passage of said unit through said nip.

4. The camera back of claim 1 wherein said drive means comprises a cam arrangement for moving said rollers from said operating position to said initial position, an electric motor and a gear train having a reduction path coupled to said rollers and said cam arrangement for transmitting power to said processing rollers and said cam arrangement so that said rollers move from said initial position to said operating position and back to said initial position during operation of said motor to drive said rollers in rotation to feed said film unit substantially through said nip.

5. The camera back of claim 4 including a first gear train coupled between said motor and said rollers to drive said rollers at a given revolutions per minute and a second gear train coupled between said motor and said cam mechanism and providing a gear reduction for operating said cam arrangement.

6. The camera back of claim 4 wherein said motor is coupled directly to said rollers by a gear arrangement, and said gear train reduction path is coupled between said rollers and said cam arrangement.

7. The camera back of claim 5 wherein said motor is mounted in worm gear drive with an extended end of a first of said rollers, and said reduction gear arrangement couples the other end of said first roller to said cam arrangement.

8. The camera back of claim 7 wherein said motor includes a motor shaft, said worm gear drive includes a worm mounted on said motor shaft for rotation therewith, and a worm gear mounted on said extended end of said first roller, and said motor is mounted with the axis of its shaft generally normal to the axis of said rollers with said worm extending across the end of the second of said rollers into engagement with said worm gear.

9. The camera back of claim 4 including switch means connected to said control means and actuated by said cam arrangement to turn said motor off when said rollers are returned to said initial position after said film unit is fed through said roller nip.

10. The camera back of claim 9 wherein said control means includes means to initiate operation of said motor while said switch means is in an OFF motor condition.

11. The camera back of claim 9 wherein said cam arrangement comprises a pair of translatable cam blocks at opposite ends of said one of said processing rollers, each of said cam blocks having a camming surface inclined to the direction of translation of said one roller, and said cam blocks arranged in cam follower arrangement to said cam for translating said blocks in a direction allowing said processing rollers to move to said operating position, and a rotatable cam coupled to each said cam block respectively and driven by said motor through said gear train to translate each said block between a first position wherein said rollers are spaced from each other and a second position wherein said rollers are in their said operating position.

12. In a camera back for processing an instant film unit having a leader, processing fluid carried by said film unit for processing of said film unit upon advancement of said film unit through pressure applying processing rollers, and a pull tab releasably attached to said leader and extending to the exterior of the camera back, the camera back including a pair of processing rollers defining a nip through which said leader and said unit are advanced from the camera back in a direction of feed to apply processing fluid across said film unit, said leader being advanced in the direction of feed to the nip of said rollers upon pulling of said tab, said leader first exiting the camera back as a leading end portion of said unit in the context of said direction of feed, the improvement wherein:

said processing rollers being mounted for rotation with at least one of said rollers being also mounted for translation toward the other roller, and said rollers are adjustable for movement between an initial position in which the rolling surfaces thereof are spaced from each other at said nip and an operating position in which the rolling surfaces thereof are biased toward one another at said nip, and further comprising:

drive means for adjusting said processing rollers between said initial and operating positions and for driveably rotating said rollers in said operating position to process said film unit in a direction of feed to discharge said film unit from the camera back; and control means for operating said drive means in response to sensing the location of a film leader within the nip of said rollers whereby upon pulling of said tab, the leaders are advanced to within the nip of the rollers and said control means thereby operates said motor to adjust said rollers to their operating position and rotate said rollers to advance said film unit.

13. The camera back of claim 12 wherein said drive means comprises a cam mechanism for moving said rollers from said operating position to said initial position, an electric motor and a gear train having reduction path coupled to said rollers and said cam arrangement for transmitting power to said processing rollers and said cam arrangement so that said rollers move from said initial position to said operating position and back to said initial position during operation of said motor to drive said rollers in rotation to feed said film unit substantially through said nip.

14. The camera back of claim 13 including switch means connected to said control means and actuated by said cam arrangement to turn said motor off when said rollers are returned to said initial position after said film unit is fed through said roller nip.

15. The camera back of claim 14 wherein said control means includes means to initiate operation of said motor while said switch means is in an OFF motor condition.

16. The camera back of claim 14 wherein said cam means comprises a pair of translatable cam blocks at opposite ends of one of said processing rollers, each of said cam blocks having a camming surface inclined to the direction of translation, spring means for translating said blocks in a direction allowing said processing rollers to move to said operating position, and rotatable cam means driven by said motor through said gear train to translate said block against said spring means to position said processing rollers in said initial position.

* * * * *